Nov. 10, 1970 H. C. NATHANSON ET AL 3,539,705

MICROELECTRONIC CONDUCTOR CONFIGURATIONS AND METHOD OF MAKING THE SAME

Filed May 31, 1968 2 Sheets-Sheet 1

WITNESSES

Helen M. Farkas

James F. Young

INVENTOR
Harvey C. Nathanson &
John R. Davis, Jr.
BY
C. L. Menzemer
ATTORNEY

Nov. 10, 1970 H. C. NATHANSON ET AL 3,539,705
MICROELECTRONIC CONDUCTOR CONFIGURATIONS AND METHOD
OF MAKING THE SAME
Filed May 31, 1968 2 Sheets-Sheet 2

3,539,705

MICROELECTRONIC CONDUCTOR CONFIGURATIONS AND METHOD OF MAKING THE SAME

Harvey C. Nathanson, Pittsburgh, and John R. Davis, Jr., Export, Pa., assignors to Westinghouse Electric Corporation, Pittsburgh, Pa., a corporation of Pennsylvania Filed May 31, 1968, Ser. No. 733,582
Int. Cl. H01l 7/02; H05k 3/06, 3/32
U.S. Cl. 174—68.5 3 Claims

ABSTRACT OF THE DISCLOSURE

Small metal-air gap metal structures are provided that can be batch fabricated as part of a microelectronic component such as an integrated circuit. Spaced metal elements of such structures can be optionally closed by compression bonding. They may also be used as crossovers in a multilayer conductive interconnection scheme, used to provide a variety of microwave functions and generally improve the flexibility and diversity available in microelectronic components.

BACKGROUND OF THE INVENTION

Field of the invention

This invention relates to microelectronic components such as integrated circuits and particularly to conductor configurations associated therewith.

Description of the prior art

Microelectronic components such as integrated circuits are becoming increasingly complex and sophisticated. There are a number of situations where the function of optional permanent switching in integrated circuits after batch fabrication would be desirable. A "switch" in this sense refers to a pair of initially open contacts that may be selectively but permanently closed to complete an electrical connection.

In some cases it is desired to simultaneously manufacture a large quantity of identical completed circuits. With previous technology it is not economical to provide small numbers of slightly varying circuits. In any case where each integrated circuit must be different, conventional processing is prohibitive.

In the past vraious means have been employed to modify circuit patterns on products that have been batch fabricated. For example, localized bonding of wire jumpers can be used to close a conductive path between two space conductive layers on the substrate. This approach is slow and costly, incurring difficulty in aligning the bold bonding ball with the pads and bonding and cutting the wire. The resulting bond is large, typically 0.003 inch diameter or more, adding excess parasitic capacitance to the wire at the bond point and restricting the inter-wiring spacing on the block in the vicinity of the bond to greater than about 0.004 inch.

There have also been proposals concerning burning out conductive elements in a batch fabricated pattern to modify the circuit. This requires passing appreciable current through the elements of the block unless elaborate extra terminals are provided. Additionally, this type of switch is normally closed and does not provide test isolation before bonding.

Crossovers in integrated circuits are important and necessary in complex cases where single layer conductive interconnections cannot be provided. Current approaches generally employ an insulating layer between spaced conductive layers or the use of diffused crossunders both of which approaches have established disadvantages.

Electronic functions at microwave frequencies have not generally been incorporated in integrated circuits in the past. It is desirable to more fully integrate microwave systems to include functions such as low loss strip lines, inductors, couplers and balanced mixers directly associated with the integrated circuit chip.

In a copending application, Ser. No. 465,090, filed June 18, 1965 by Nathanson and Wickstrom and assigned to the assignee of the present invention there are disclosed structures and methods of making them involving spaced metal members on integrated circuits, such as for cantilever beams in resonant gate transistors and for conductive crossovers. The present invention concerns significant refinement of the methodology therein disclosed as well as several significantly new structural terms.

SUMMARY OF THE INVENTION

Metal-air gap-metal structures for post fabrication switching, crossovers, and microwave transmission lines, couplers and other applications for microelectronic components such as integrated circuits are provided by this invention with improvement over the prior art in several respects. Among the important properties of the structure as applied to selectively interconnecting or switching between otherwise open conductors are that the size of the switch assembly be no wider than about 0.001 inch corresponding to the width of the aluminum interconnect or gold wire path with which it is joined, i.e., when applied to conventionally batch fabricated integrated circuits. This insures that the convenience gained by this type of structure is not at the expense of substantially increased circuit area. There are simple, quick, inexpensive means, consistent with some degree of automation, of selectively closing switches. The impedance of the switch when in the open condition is extremely high relative to the internal circuit impedance at all frequencies of interest. For a high frequency integrated circuit, this means a very small interelectrode capacitance in the open circuit position, e.g., in the range of $10^{-3}$ pf. or less. Open circuit conductance is also negligible, such as $10^{-16}$ mhos or less. In the closed position the impedance of the switch is low relative to any important impedance in an integrated circuit. For some applications this requires resistance in the milliohm range. Quite importantly, incorporation of the switching structure into the integrated circuit block involves minimal extra fabrication steps and is an inherently high yield process.

Very small metal-air gap metal structures can be fabricated in a manner similar to that disclosed in the above-mentioned copending application, however, it is preferred that certain modifications thereof be performed as will be subsequently described herein. In brief summary, a first layer of metal is deposited on the substrate and delineated into a desired pattern. A second layer of metal is then formed in a pattern to act as a spacer. A third layer of metal is deposited after which the spacer layer is removed, as by etching, leaving the bottom bayer and third layer spaced by a precisely defined, uniformly small air gap. In accordance with this invention typical gaps can be made from about 1 micron up to about 25 or more microns wide. Dry air as a dielectric is virtually a perfect insulator at moderate voltages. For example, at a 5 micron spacing, with air at atmospheric pressure, conduction occurs at a gap voltage of about 400 volts, well beyond the range of most integrated circuits. With lower pressure air the breakdown voltage can be greatly increased.

Switch structures can be selectively, permanently, closed by an external bonding wedge applied to projecting tabs on the spaced conductor with the result that the closed contact resistance is as good or better than that of the original conductor. No additional wire or critical wire to pad alignment is needed. All materials necessary to make the bond are built into the chip in the appropriate spot. Where the conductive layers comprise a layer such as gold, the bonding can be done cold taking advantage of the fact that gold will flow easily into glod under pressure. Since no separate bonding material need be inserted at the bonding point, only a small bonding wedge is necessary to provide the pressure to make contact. This permits use of a multiple wedge bonding head, each wedge in a proper position, that can be activated to a pressure of 5 to 7 grams by a series of attached transducers under programmed control. In concept such a scheme permits typing into a read only memory or the like. Alternatively, a number of fixed probe heads, themselves fabricated by photoresist processes on a substrate can be provided to press bond a given block directly into one of any number of possible configurations.

If the wedges making the bonds are themselves conducting, they can be used to probe the circuit before the switches are closed. This offers the advantage of probing at a relatively low interconnection level where interpretation of the results is less complicated. Other means to form bonds may be achieved as by selective application of a programmed electron beam.

BRIEF DESCRIPTION OF THE DRAWING

FIGS. 1 and 2 are, respectively, plan and sectional views of one embodiment of the present invention wherein FIG. 2 is taken along line II—II of FIG. 1;

DESCRIPTION OF THE PREFERRED EMBODIMENTS

Figures 1, 2:
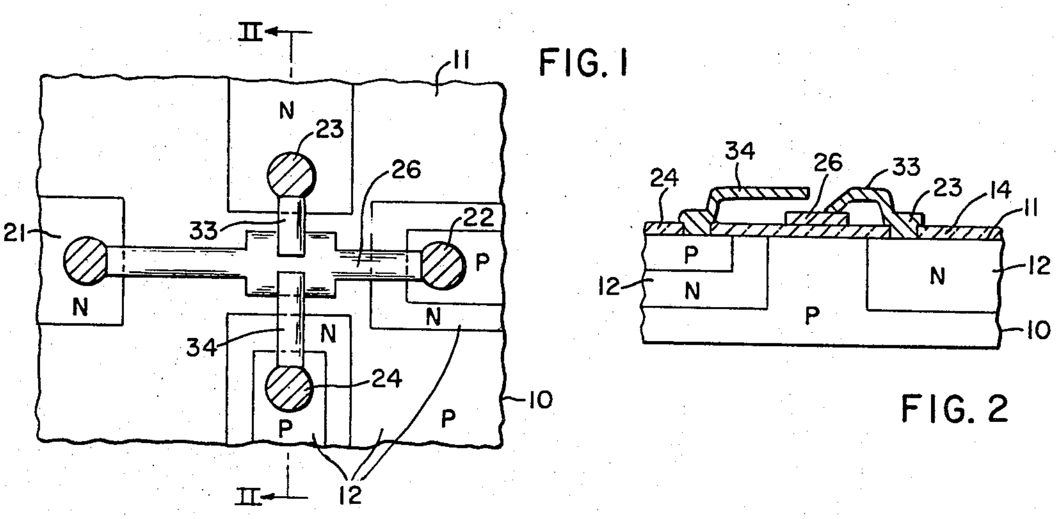

Referring to FIGS. 1 and 2, an example of the present invention is shown comprising a substrate 10 upon which a conductive switch structure has been formed. The substrate 10 in this example is a semiconductor integrated circuit in which the particular regions 12 illustrated are of no special significance to this invention but merely show a typical form for purposes of example. On the surface 11 of the substrate 10 an insulating layer 14, such as one of silicon dioxide or successive layers of silicon dioxide and silicon nitride, protects the surface every where except where contact to the semiconductor material is desired. The layer is omitted in FIG. 1 for clairity.

The crosshatched elements in FIG. 1 are of conductive material directly in contact with the semiconductor. These includes contacts 21, 22, 23 and 24 to an N-type region at the left, a P-type region at the right, and N-type region at the top, and a P-type region at the bottom of FIG. 1, respectively. The first pair of contacts 21 and 22 are directly joined by a conductive interconnection 26 disposed over the insulating layer 14 in accordance with conventional processing. Joined to the lower contact 24 is a conductive member 34 that extends in spaced relation to the interconnect 26 while a similar member 33 extending from the upper contact 23 has been placed in conductive contact with the interconnect.

In initial fabrication, the ohmic contacts 21, 22, 23 and 24 and the conductive interconnection 26 on the substrate are formed by metallization and pattern delineation as in conventional processing, while the air spaced members 33 and 34 joined to the ohmic contacts are formed by a process employing a spacer layer, second conductive layer, and removal of the spacer layer. Then one of the extended conductive members 33 has been bonded to the interconnect 26 by compression bonding to close permanently the circuit therebetween. Of course both switches can be closed or open depending on the intended modification of the preexisting integrated circuit.

It has been found that a 0.001 inch radius sapphire wedge produces a satisfactory cold bond between members at a pressure of 7 grams with essentially zero resistance. The overlapping area of the air spaced metal elements is only about 0.25 square mil minimizing the feed-through capacity of an open switch. Such switches have been made with numerous air spaced contact elements over a common conductive pad with any set of these elements bonded to the pad. Other means such as an electron beam or electrostatic attraction may also be used to close the switches.

Figure 3:
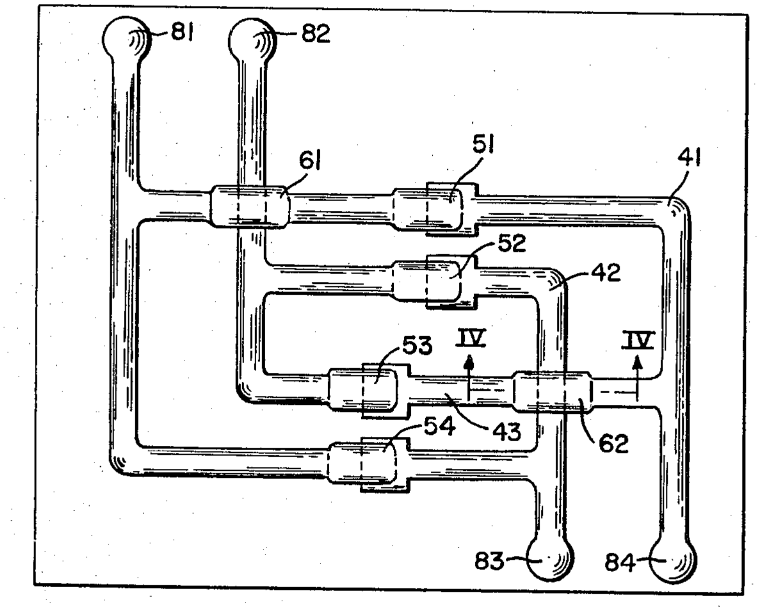
FIG. 3 is a plan view of another form of the invention.
Figure 4:
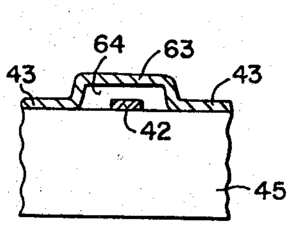
FIG. 4 is a sectional view taken along line IV—IV of FIG. 3.

The configuration of FIG. 3 is an example of the use of switches like that of FIG. 1 as well as crossovers. One particular application to which the configuration of FIG. 3 may be put is that of a polarity reverser. There are four possible branches to the circuit on substrate 50 between contacts 51, 52, 53 and 54. There is a switch 51, 52, 53 or 54 in each of the branches, 41, 42, 43, 44, respectively. Each switch is a single pole switch like half of the structure of FIGS. 1 and 2. When switches 51 and 52 only are closed, the output polarity (say at contacts 53 and 54) is reversed relative to the polarity when the lower two switches 53 and 54 only are closed. For a configuration of this sort, two crossovers 61 and 62 of which one is shown in section in FIG. 4 are required wherein a conductive member 42 directly on the substrate 45 has crossing over it another conductor 63 spaced by an air gap 64. It is apparent that through the selection of various locations for switches with any number of contact elements, as well as crossovers, that quite complex conductive patterns may be formed. The crossovers are highly useful of course even without their employment with switches and the opposite is also true.

Figures 5, 6, 7, 8, 9:
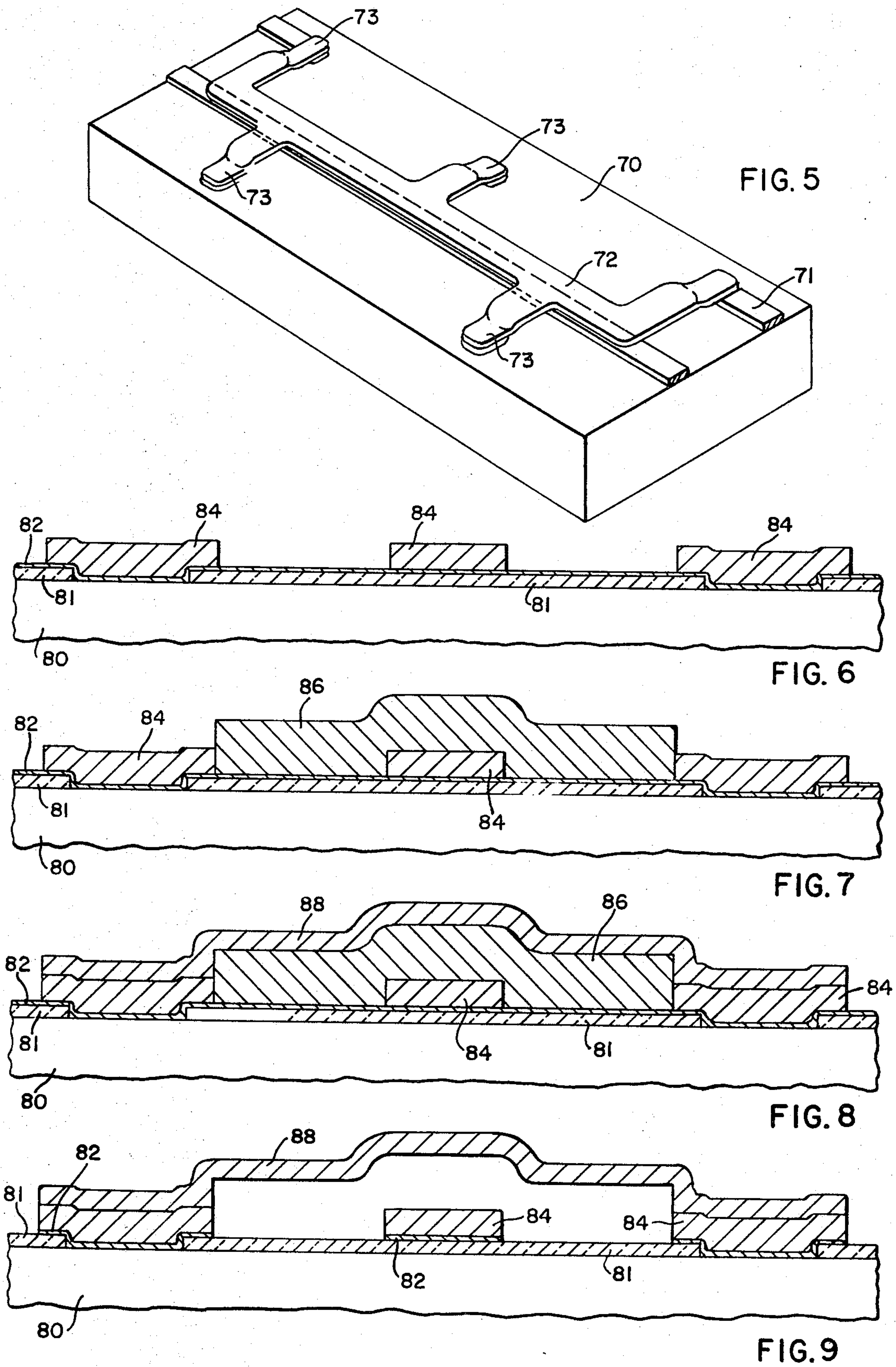
FIG. 5 is a plan view of an alternate form of the invention.
FIGS. 6 to 9 are partial sectional views of a structure at successive stages in fabrication in accordance with this invention.

FIG. 5 illustrates one particular application of utility in microwave devices wherein a first conductor 71 disposed on a substrate 70 has spaced from it, over a comparatively long distance, another conductor 72. The upper conductor may be a trunk line with a uniform spacing of 5 microns from the lower conductor. The distance between them and the width of the conductors can permit the pair to act as a strip line for propagating radio frequency energy. For instance, with an air or vacuum dielectric two beams of width 0.0015 inch and spacing of about 5 microns will exhibit a characteristic impedance of 50 ohms. Such strip lines produce very low losses in that the dielectric is of low loss and both conductors are metallic. This is in contrast to other strip line structures wherein the bottom conductor, usually silicon, may be relatively resistive. Tabs 73 extending from the upper conductor 72 are joined to the surface of substrate 70 for structural rigidity in the manner of the completion of the switch of FIG. 1. This permits having strip lines of arbitrary length. Such finely spaced uniform conductors permit a variety of microwave applications as is well known in the microwave art and need not be extensively described herein.

The invention as described may be extended to the formation of additional conductors spaced from a first spaced conductor, to provide even more complex structures such as for switches, crossovers and microwave elements.

Among the many other purposes to which spaced conductors in accordance with this invention may be put are to provide an electrostatic shield over part of an integrated circuit and, also, to provide a relatively massive conductor, not requiring much semiconductor surface area, to act as a bus bar or the like.

An understanding of the invention and the flexibility with which it may be used to form a widely diverse set of conductors with various switches, crossovers, including patterns with right angle turns or essentially any geometrical configuration, will be aided by consideration of the following description of preferred methods for carrying out the present invention which makes them directly relevant to present day integrated circuit fabrication technology. FIGS. 6 through 9 show steps in the fabrication process. In FIG. 6 a substrate 80 such as a silicon integrated circuit is shown after having been processed through all necessary operations modifying its internal structure and formation of the final insulating layer 81 at the surface with openings where contacts are desired to the semiconductor material. The insulating layer such as of silicon dioxide may be of about 10,000 angstroms thickness thermally grown oxide or other suitable insulating material. Conventional photoresist masking and etching are used to form the windows in the oxide.

Cleanliness of surfaces upon which a subsequent layer is to be deposited is important at all stages of the fabrication process. Various known cleaning techniques may be employed. For example, to prepare the oxidized surface for subsequent deposition the oxidized substrate may be boiled in trichloroethylene for about 5 minutes, rinsed two or three times in acetone, dipped in methanol three times, placed in fuming nitric acid at about 100° C. for about 25 to 35 minutes, rinsed in running deionized water for about 5 minutes, rinsed in methanol, and dried in hot air.

As soon as possible after the surface of layer 81 is clean a first metal layer 82 is deposited over the entire surface. Various known deposition techniques may be employed. As an example, sputtering may be employed, although vacuum evaporation as well as others may be used. Sputtering is preferred for somewhat better adherency. The substrate is placed in the sputtering system and the system is pumped down to less than $10^{-6}$ torr. Liquid nitrogen trapping is used. The chamber is back-filled with argon to a pressure of about 10 microns. The first metal layer 82 is selected particularly for its adherence to the substrate, the oxide or insulating layer 81 in this case, its ability to make ohmic contact to the exposed semiconductor, and for its ability to have subsequent metal deposited thereon as by plating.

For fabrication on oxidized silicon integrated circuits, the first metal layer may suitably comprise a first portion of about 400 angstroms thickness of chromium followed by about 1000 angstroms of gold. With clean sputtering electrodes, the current and voltage parameters are adjusted for the particular set-up and the workpiece subjected to the metals in sequence for times necessary to achieve the desired thickness. The metals of layer 82 may be of various types deposited by various techniques. By way of further example, titanium or zirconium may be used instead of chromium. Aluminum (for better ohmic contacts) can precede one of the metals by Ti or Zr, the latter metal being desirable because of the limited platability of Al.

A mask pattern (not shown) is formed over the first metal layer 82, as by conventional photoresist processing. This first mask has openings wherever a first metal layer in the finished structure is desired, such as in the window area and where a conductor is desired over the oxide layer. By metal deposition, preferably by plating or electroplating, metal is deposited through the openings in the first mask onto the exposed chromium-gold layer. Plating is preferred because it can be performed selectively and can quickly and easily provide the required thickness. This metal is selected for its ease of deposition as well as for other qualities that will be apparent subsequently. The thickness of this layer is not highly critical, typically 1 to 4 microns of gold may be used. After plating for a time sufficient to achieve the required thickness, the substrate is removed from the plating bath. The mask is stripped leaving the patterned metal layer 84 and the surfaces are thoroughly cleaned.

A second mask (not shown) is then formed it may also be by photoresist processing. This time there are openings in the mask wherever it is desired to provide an air gap between a conductor and the substrate or a conductor on the substrate.

FIG. 7 shows the structure after there has been deposited through the second mask a third layer of metal

86 that acts as a spacer for precisely spacing a subsequently applied conductive layer. This meteal may be deposited by plating or another technique and is selected to be of a kind that may be removed without disturbing the subsequently applied conductive layer. For this purpose, particularly when considering a conductive layer of a noble metal such as gold it is suitable to employ a metal selected from the group consisting of, for example, nickel, copper, silver, cadmium, tin, lead and other platable and selectively removable metals, alloys thereof (e.g., as formed by coplating), and compounds such as metal oxides as may be deposited by sputtering or evaporation and can be precisely formed in thicknesses less than 1 micron. Thickness control is important in the spacer layer. Its thickness is chosen as that of the desired air gap. Merely as an example it might be 6 microns. Such thicknesses are relatively straight-forward to control within about a micron tolerance. After plating of the nickel, the second photoresist mask is stripped.

It is desired in some instances before the stripping of the second photoresist mask to deposit on the spacer layer a thin flash of gold. This is desirable where high precision is important as for the vibrating member in an RGT. The purpose is to make sure the photoresist stripping solution does not attack the nickel.

After the second photoresist mask is stripped and the surfaces are cleaned, a third mask (not shown) is formed that also may be made by photoresist processing. The openings in the third mask are in all areas in which metal is to be spaced from the substrate as well as in contact with elements previously formed. FIG. 8 shows a structure after additional metal 88 has been deposited through the third mask as by plating to form 3 to 4 microns of gold which contacts the contact area metal 84 and also is disposed over the spacer layer 86. The conductive layer 88 can be of various compositions although gold is convenient and preferred for most purposes. Normally a good conductor is desired and aluminum (e.g., using evaporation and selective removal for pattern formation), silver and copper could also be used. For RGT beams with low temperature coefficient of frequency, a conductive member of palladium would be good. Where the conductive layer 88 is not intended to be a good conductor, it may be selected of known resistive materials, e.g., nickel-iron alloys. Besides deposition by plating and the like it is suitable to place a foil of the conductive material for layer 88 in intimate contact with the surface and selectively remove portions to get the desired pattern. In any case the selection of layer 88 material is made so spacer layer 86 can be removed, as by chemical etching, without substantially disturbing the conductive layer 88.

After the gold layer 88 is deposited as shown in FIG. 8 it is sometimes desirable to deposit an additional nickel over plating of about 5 microns thickness. This optional step may be used where high precision is important as for the vibrating member of an RGT. The purpose is to compensate for any stress that may occur at the bimetal interface between layers 86 and 88.

The third mask is then stripped and an etchant applied that attacks substantially only the metal of the spacer layer, the nickel in this case. As an etch it is convenient to use one part concentrated nitric acid in water heated to about 60° C. To prevent nickel from depositing elsewhere on the substrate it is preferred to etch for a short time and rinse in deionized water repeating this sequence until all of the nickel is removed.

The remaining steps are to remove the exposed original chromium-gold layer. This does not require the application of a separate mask because of the difference in thickness of the appropriate layers present. The gold may be etched in aqua regia prepared from one part concentrated nitric acid, three parts concentrated hydrochloric acid and four parts deionized water heated to about 40° C. Etching is continued until the chromium surface appears.

The chromium is then etched using an etchant such as part of a saturated solution $K_3Fe(CN)_6$ with NaOH to provide a pH of 8 to 10, to one part deionized water and heated to about 60° C. Etching is continued while the substrate is visually inspected in a low level reflective white light. Interference colors due to chrome oxide will be observed. These colors will vanish when the chromium is gone. After rinsing in deionized water the substrate is again placed in the nitric acid etch employed for the nickel removal for about 30 seconds and then rinsed again and then returned to the chromium etch for about 5 seconds or until the interference haze disappears. The piece is then cleaned in deionized water, acetone and methanol and dried. The completed structure appears as in FIG. 9. The foregoing process, while somewhat more complicated, has been found more consistently reproducible than the use of a photoresist layer as the spacer such as in the above referred to copending application.

It is apparent that any number of conductors in a variety of configurations may be simultaneously fabricated. It is also the case that additional spaced conductors may be provided as by the deposition, after the stage shown in FIG. 8, of an additional mask for defining a second stage spacer layer, plating of the second stage spacer layer plus the further mask for defining the third stage conductor layer etc. following which etching to remove the spacer layers and the original chromium-gold layer may be performed as above-described.

While the present invention has been shown in a few forms only, it will be apparent that various changes and modifications may be made without departing from the spirit and scope thereof.

We claim:

1. A microelectronic component comprising:

a substrate; a first pattern of conductors on a surface of said substrate; a second pattern of fixed conductors disposed in part directly above and permanently spaced in part from said first pattern without intervening support; said second pattern including a plurality of projecting tabs that can be selectively, permanently bonded to elements of said first pattern and said substrate.

2. The subject matter of claim 1 wherein: said first pattern includes a plurality of essentially linear elements and said second pattern includes at least one essentially linear element connecting two of said first pattern linear elements and crossing over at least one other of said first pattern linear elements.

3. The subject matter of claim 1 wherein: an element of said first pattern is uniformly spaced from an element of said second pattern over a length at least an order of magnitude greater than the spacing therebetween.

References Cited

UNITED STATES PATENTS

| | | |
|---|---|---|
| 3,312,871 | 4/1967 | Seki et al. |
| 3,374,110 | 3/1968 | Miller. |
| 3,436,611 | 4/1969 | Perry. |

DARRELL L. CLAY, Primary Examiner

U.S. Cl. X.R.

29—589, 625; 156—3; 317—101, 234